United States Patent [19]

Hansen, Sr.

[11] Patent Number: 4,879,162

[45] Date of Patent: Nov. 7, 1989

[54] BURYABLE WARNING TAPE

[76] Inventor: James B. Hansen, Sr., 2010 E. Old Elm Rd., Lindenhurst, Ill. 60046

[21] Appl. No.: 172,487

[22] Filed: Mar. 24, 1988

[51] Int. Cl.$^4$ .......................... B32B 3/00; B32B 27/14
[52] U.S. Cl. ...................................... 428/196; 40/615; 405/157; 428/204; 428/252; 428/244; 428/906
[58] Field of Search ............... 428/196, 204, 252, 244, 428/906; 405/157; 40/615

[56] References Cited

U.S. PATENT DOCUMENTS 4,562,107 12/1985 Daniels ................................ 428/196

Primary Examiner—Marion C. McCamish
Attorney, Agent, or Firm—George H. Gerstman; Garrettson Ellis

[57] ABSTRACT

A buryable warning tape comprises a length of woven polyolefin fabric. Visible indicia are printed on a first face of the fabric in ink which is essentially nondegradable during burial, typically an ink with a carbon-based pigment. A transparent polyolefin coating is bonded to and covers the first face. Preferably a second polyolefin coating is bonded to and covers the side of the fabric which is opposed to the first face. Such warning tape can have greatly increased tensile strength and tear strength over the warning tapes of the prior art, and the indicia have significantly improved durability.

14 Claims, 1 Drawing Sheet

FIG. 1
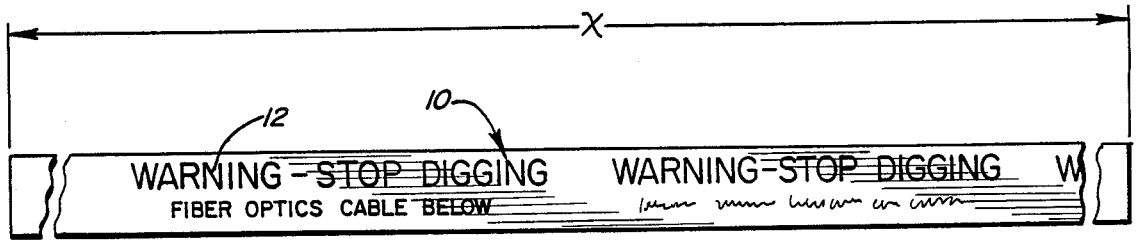
FIG. 2
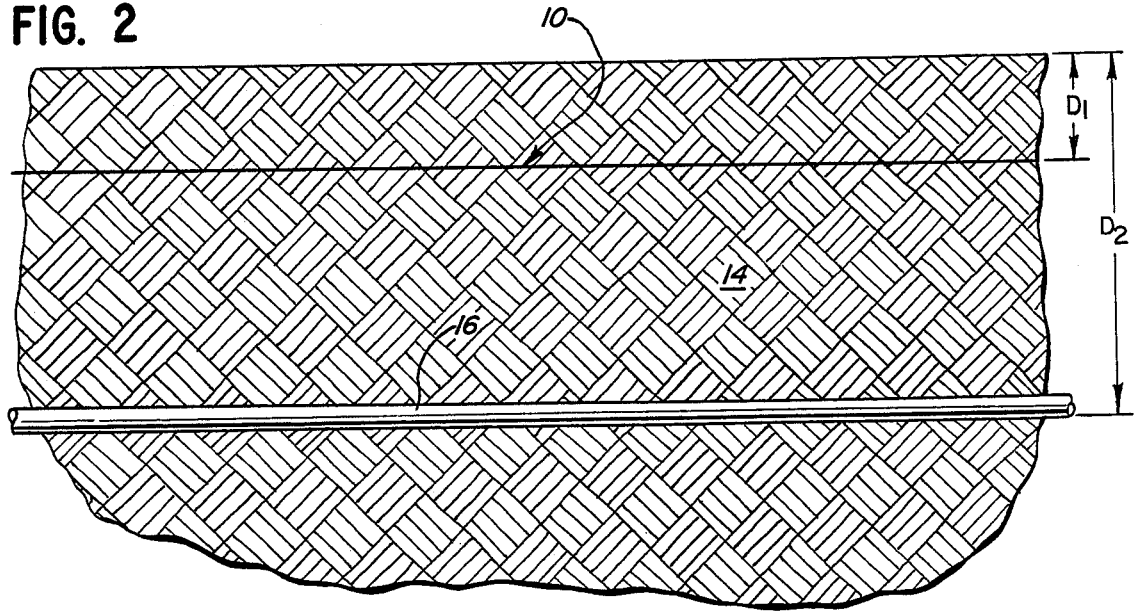
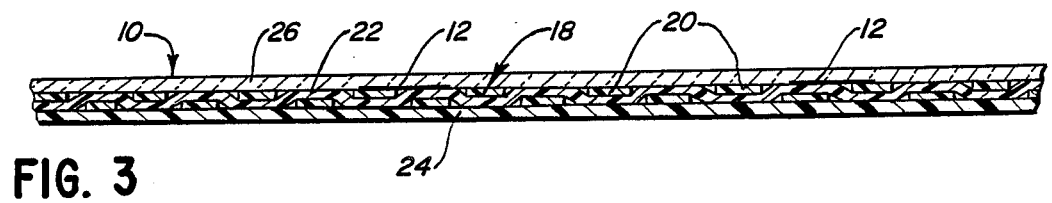
FIG. 3

BURYABLE WARNING TAPE

BACKGROUND OF THE INVENTION

Buried pipes and cables are often protected by means of a warning tape, buried in the ground above the pipe or cable at a substantially lesser depth. The hope is that as someone is using a backhoe or the like to dig a trench, they will first encounter the warning tape and be thus warned to stop digging before damaging the pipe or cable.

The warning tapes of the prior art are made of plastic films, upon which printed indicia may be impressed. the printing typically carries a warning and may describe the type of cable or pipe which is underneath the tape. Several disadvantages of prior art buryable warning tapes include the fact that plastic films tend to have a fairly low tensile strength and a very low tear strength. Thus, a backhoe may cut through a warning tape of the prior art without the operator even noticing.

Furthermore, the visible indicia printed on the prior art fabric does not stand up well to underground conditions. The ink of the indicia is easily abraded off both in the installation of the warning tape, and also while being inadvertently dug out by a backhoe or the like. This is made worse by the fact that the ink is constantly subject to the moist conditions of the underground, so that its binder can deteriorate.

In accordance with this invention, a different type of buryable warning tape is provided, having greatly increased tensile and tear strength, and also greatly increased durability of visible indicia carried thereon, so that the warning provided by the tape is clearer and more reliable. The tape of this invention is strong enough so that when engaged by a backhoe, it can entangle the backhoe and be pulled out of the ground without breaking as the backhoe retracts in its digging motion. Thus the tape can make its presence known in a very obvious and tangible way to the operator of a digging machine, for improved protection of a cable or pipe underneath the warning tape. Additionally, the warning tape of this invention exhibits improved durability for the visible indicia carried thereon, so that even after years of burying, the tape can effectively perform its function.

DESCRIPTION OF THE INVENTION

In accordance with this invention, a buryable warning tape comprises a length of woven plastic, preferably polyolefin fabric. Visible indicia are printed on the first face of the fabric in ink which is essentially non-degradable during burial, typically an ink with a pigment such as powdered carbon. A transparent plastic coating is bonded to and covers the first face for protection and retention of the ink indicia on the first face. Prefereably, a second plastic coating is bonded to and covers the side of the fabric which is opposed to the first face, so that the fabric is effectively sealed within a pair of opposed, bonded polyolefin coatings, for further protection and retention of the ink indicia in position on the woven plastic fabric, and also to firmly secure together the individual strands of the plastic fabric.

Preferably, the plastic used is polyolefin, although other materials such as biaxially oriented polyester or the like may be used.

Such a warning tape, having a preferred width of about 2 to 18 inches, may have a tensile strength of at least about 8,000 pounds in the direction transverse (i.e., generally perpendicular) to the axis of the warning tape, and a tensile strength of at least about 5500 pounds in the longitudinal direction (i.e., generally parallel to the axis of the tape) as tested by ASTM D882. Both tensile strengths are capable of achieving values which are substantially higher than these minimal values. Accordingly, the warning tape of this invention is strong enough so that a long strip of the buried tape (for example one hundred feet) can be pulled right out of the ground after accidental engagement with a backhoe. This can provide a warning to the operator of the backhoe which can hardly be ignored. Additionally, the woven polyolefin fabric used in the warning tape of this invention provides an exceedingly high tear strength to the tape of this invention, which contributes to its excellent performance.

The woven polyolefin fabric used in this invention may preferably comprise woven polyolefin strips of a width of about 0.05 to 0.5 inch, and from about 0.002 to 0.01 inch in thickness, in a typical warp and weft, woven pattern. The respective strips of the warp and weft are preferably in substantially side-by-side, abutting relation with each other to minimize open spaces through the fabric, which of course increases the tensile strength thereof to essentially a maximum value for the particular polyolefin strips used.

The transparent polyolefin coatings may preferably each have a thickness of about 0.001 to 0.002 inch, which is sufficient to provide good protection to the woven fabric and ink indicia at a low material cost.

DESCRIPTION OF THE DRAWINGS

In the drawings,

FIG. 1 is a plan view, of one embodiment of variable warning tape made in accordance with this invention;

FIG. 2 is a generally diagramatic view, showing how the buryable warning tape of this invention may be buried above a pipe or cable to overlie it in spaced relation for protection thereof; and FIG. 3 is an enlarged, longitudinal sectional view of a portion of the buryable warning tape of this invention.

DESCRIPTION OF SPECIFIC EMBODIMENT

Referring to FIGS. 1–3, buryable warning tape 10 is shown to comprise a length of tape of any desired distance x, typically hundreds of feet long and mounted on a roll type dispenser. Tape 10 can be seen to carry printed indicia 12 which provide a warning appropriate to the circumstances. As shown in FIG. 2, warning tape 10 may be buried in the ground 14 in a path which directly overlies a buried pipe or cable 16. The depth of burial D1 of warning tape 10 is substantially less than the depth of burial D2 of pipe or cable 16. Typically, warning tape 10 can be buried about 8 to 12 inches in the ground, while pipe or cable will be typically buried at 3 feet or greater depth. Accordingly, the first digging stroke of a backhoe or other device in the area is very likely to engage tape 10 before pipe or cable 16 is engaged. The great tensile and tear strength of tape 10 can permit it to be pulled out of the ground with the retraction of the backhoe, as stated above, to provide a very obvious warning.

Turning to FIG. 3, warning tape 10, in a preferred embodiment, is shown to comprise a central section of woven polyolefin fabric 18 comprising warp strips 20 of polyolefin sheeting and weft strips 22 of similar polyolefin sheeting. It can be seen that the warp strips 20, and also the weft strips 22, are spaced as close together as possible, to provide the maximum number of strips per unit area. Warp and weft strips 20, 22 may be typically about 0.003 inch in thickness, there being, for example 9 warp strips and 5 weft strips per square inch, their widths being respectively on the order of 1/9 and 1/5 inch each. Alternatively, there may be 10 warp strips 20 and 4 weft strips 22 per square inch, with their respective widths being on the order of 1/10 inch and ¼ inch. Woven polyolefin fabrics of this type are commercially available from the duPont Chemical Company, or from Nova-Thene, Ltd. of Halifax, Nova Scotia, Canada.

Preferably, warning tape 18 carries a bottom polyolefin coating 24, which is applied to the assembly typically in the same process as the weaving of fabric 18, and adheres to fabric 18 to bond the various warp and weft strips 20, 22 together. Polyolefin layer 24 may be applied by a conventional solvent-based or extrusion coating process, for example, and may typically have a thickness on the order of 0.001 to 0.005 inch.

Typically, in the manufacturing process, the ink indicia 12 are applied to the assembly comprising fabric 18 and lower polyolefin support layer 24 before upper polyolefin support layer 26 is applied, so that the ink directly bonds to the polyolefin fabric. As is conventional in such processes, the polyolefin fabric may be electrostatically charged to assist in bonding of the ink of indicia 12. Then, preferably immediately thereafter, upper, transparent polyolefin coating 26 may be applied in conventional manner such as another solvent based or extrusion process, to encapsulate and seal fabric 18 and indicia 12 in their desired positions. Polyolefin layer 26 is transparent, so that indicia 12 may be visible while being protected by layer 26, and may also have a thickness on the order of 0.001 to 0.005 inch. Polyolefin layer 24 is typically transparent, but may be filled with a reinforcing material or the like, if desired, since transparency is typically not necessary for that layer.

The polyolefin materials used for forming coatings 24, 26 are preferably extruded onto polyolefin fabric 18. Commercially available polyolefin coating compositions from, for example, duPont or Exxon may be used. The polyolefin materials used to make the warning tape of this invention are typically commercially available alloys of polyethylene and polypropylene and/or copolymers thereof.

The resulting warning tapes made in accordance with this invention may have an actual tensile strength on the order of 10,400 pounds in the transverse direction and 7080 pounds in the longitudinal direction, when a tape of 6 inch width is measured. Such a tape is capable of exhibiting the advantages discussed above.

Polyolefin fabric 18 desirably contains a small amount of inorganic pigment to exhibit a bright color, for example, orange, yellow, or bright blue, red or green. The tape may also contain "organic compound" sold for example by Danna Films Inc. of Boston, Massachusetts or Fabrine Inc. of North Bay, Ontario, Canada, which serves to preserve the color of the tape through long periods of burial as is well known in the art.

Accordingly, a tape of improved tensile strength, tear strength, and durability of its indicia, is provided for long-term burying, to provide improved warning protection for buried cables and pipes.

The above has been offered for illustrative purposes only, and is not intended to limit the scope of the invention of this application, which is as defined in the claims below.

That which is claimed is:

1. A buryable warning tape which comprises a length of woven plastic fabric, visible indicia printed on a first face of said fabric in ink which is essentially nondegradable during burial, and a transparent, plastic coating bonded to and covering said first face.

2. The warning tape of claim 1 in which said plastic is polyolefin.

3. The warning tape of claim 2 which has a width of about 2 to 18 inches.

4. The warning tape of claim 2 which has a tensile strength of at least about 8000 pounds in the transverse direction and at least about 5500 pounds in the longitudinal direction, as tested by ASTM D882.

5. The warning tape of claim 2 in which said woven polyolefin fabric comprises woven polyolefin strips of a width of about 0.05 to 0.5 inch and from about 0.002 to 0.01 inch in thickness in a warp and weft pattern, the respective strips of the warp and weft being in substantially side-by-side, abutting relation with each other to minimize open spaces through the fabric.

6. The warning tape of claim 2 in which said transparent polyolefin coating has a thickness of about 0.001 to 0.002 inch.

7. The warning tape of claim 2 in which said nondegradable ink contains a carbon-based pigment.

8. The warning tape of claim 2 in which the woven polyolefin fabric is brightly colored.

9. A buryable warning tape which comprises a length of woven polyolefin fabric, visible indicia printed on a first face of said fabric in ink which is essentially nondegradable during burial, a transparent polyolefin coating bonded to and covering said first face, and a second polyolefin coating bonded to and covering the side of said fabric which is opposed to said first face, said warning tape having a tensile strength of at least about 8000 pounds in the transverse direction and at least about 5500 pounds in the longitudinal direction, as tested by ASTM D882.

10. The warning tape of claim 9 in which said nondegradable ink contains a carbon-based pigment.

11. The warning tape of claim 10 in which said woven polyolefin fabric comprises woven polyolefin strips of about 0.05 to 0.5 inch and from about 0.002 to 0.01 inch in thickness in a warp and weft pattern, the respective strips of the warp and weft being in substantially side-by-side, abutting relation with each other to minimize open spaces through the fabric.

12. The warning tape of claim 11 in which said transparent polyolefin coatings each have a thickness of about 0.001 to 0.002 inch.

13. The warning tape of claim 12 which has a width of about 2 to 18 inches.

14. The warning tape of claim 13 in which the woven polyolefin fabric is brightly colored.

* * * * *